United States Patent [19]
Maier et al.

[11] Patent Number: 5,854,351
[45] Date of Patent: Dec. 29, 1998

[54] RADIO FREQUENCY HEATING OF TRANS-1, 4-POLYBUTADIENE

[75] Inventors: Thomas Robert Maier, Brecksville; Bruce Raymond Hahn, Hudson; Brian John Doucet, Akron, all of Ohio

[73] Assignee: The Goodyear Tire & Rubber Company, Akron, Ohio

[21] Appl. No.: 879,350

[22] Filed: Jun. 20, 1997

[51] Int. Cl.⁶ .................................................. C08L 23/26
[52] U.S. Cl. ........................................ 525/197; 524/491
[58] Field of Search ............................ 523/137; 522/158, 522/159; 427/498, 508, 595, 551; 525/197; 521/50.5, 47; 524/491

[56] References Cited

U.S. PATENT DOCUMENTS

| | | |
|---|---|---|
| 2,506,814 | 5/1950 | Sayre . |
| 2,966,469 | 12/1960 | Smythe et al. . |
| 3,055,848 | 9/1962 | Hackmaier et al. . |
| 3,121,674 | 2/1964 | Guthrie . |
| 3,226,312 | 12/1965 | Lamm et al. . |
| 3,247,088 | 4/1966 | Anderson . |
| 3,328,194 | 6/1967 | Kasper . |
| 3,330,748 | 7/1967 | Lawton . |
| 3,583,882 | 6/1971 | Bartrug . |
| 4,102,761 | 7/1978 | Bohm . |
| 4,103,057 | 7/1978 | Takimoto et al. . |
| 4,221,253 | 9/1980 | Seiberling . |
| 4,225,690 | 9/1980 | Halasa et al. ............................ 526/183 |
| 4,559,093 | 12/1985 | Berggren et al. . |
| 4,595,616 | 6/1986 | Bell et al. ................................. 428/76 |
| 4,721,738 | 1/1988 | Ellis et al. ............................... 524/137 |
| 5,089,574 | 2/1992 | Castner .................................... 526/142 |
| 5,213,723 | 5/1993 | Aoshima et al. .......................... 522/60 |
| 5,448,002 | 9/1995 | Castner .................................... 526/140 |
| 5,496,863 | 3/1996 | Kitagawa et al. ....................... 522/117 |
| 5,753,761 | 5/1998 | Sandstrom et al. ..................... 525/197 |

FOREIGN PATENT DOCUMENTS

| 67187 | 3/1997 | Japan ............................. C30B 15/00 |
|---|---|---|

*Primary Examiner*—Veronica P. Hoke
*Attorney, Agent, or Firm*—Alvin T Rockhill

[57] ABSTRACT

This invention specifically discloses a process for heating trans-1,4-polybutadiene to a temperature at which it can be processed without causing oxidative gelation which comprises heating the trans-1,4-polybutadiene by exposing it to electromagnetic radiation having a frequency in the range of about 2 MHz to about 80 MHz, wherein the trans-1,4-polybutadiene is oil-extended with at least 10 phr of a processing oil.

22 Claims, No Drawings

RADIO FREQUENCY HEATING OF TRANS-1, 4-POLYBUTADIENE

BACKGROUND OF THE INVENTION

By virtue of its high level of crystallinity, trans-1,4-polybutadiene (TPBD) is a thermoplastic resin. Because it contains many double bonds in its polymeric backbone, TPBD can be blended and cocured with rubber. TPBD is similar to syndiotactic-1,2-polybutadiene in this respect. Even though the trans-1,4-polybutadiene of this invention is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem which is frequently encountered when this three-component catalyst system is utilized in the synthesis of TPBD. Gelation is a particularly serious problem in continuous polymerizations. By utilizing the catalyst system and techniques of this invention, TPBD can be synthesized in a continuous process with only minimal amounts of gel formation.

U.S. Pat. No. 5,089,574 is based upon the finding that carbon disulfide will act as a gel inhibitor in conjunction with three component catalyst systems which contain an organocobalt compound, an organoaluminum compound and a para-alkyl substituted phenol. U.S. Pat. No. 5,089,574 also indicates that conversions can be substantially improved by utilizing para-alkyl substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl substituted phenol.

The presence of residual cobalt in TPBD made with cobalt-based catalyst systems is not desirable. This is because the residual cobalt acts as a prooxidant leading to polymer instability during storage. This is a particular problem in cases where the TPBD is stored in a "hothouse" prior to usage, which is a standard procedure in many industries, such as the tire industry. In any case, high levels of residual cobalt in the TPBD lead to problems with polymer stability.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased. This accordingly leads to greater polymer instability.

Due to its high melting point, it is normally necessary to heat TPBD in order for it to be processed using conventional mixing equipment, such as a Banbury mixer or a mill mixer. This heating step is typically carried out by storing the trans-1,4-polybutadiene in a "hothouse" for a few days prior to its usage. During this storage period, the bails of the polymer are slowly heated to a temperature above about 104° F. (40° C.). At such temperatures, the polymer can be readily processed in standard mixing equipment. However, the TPBD typically undergoes undesirable oxidative crosslinking which leads to gelation during this long heating period. This oxidation can crosslink the TPBD to such a high degree that it cannot be processed utilizing standard mixing techniques. In other words, the oxidative gelation that occurs can destroy the polymer.

SUMMARY OF THE INVENTION

This invention is based upon the unexpected discovery that TPBD which contains a processing oil can be rapidly heated by radio frequency electromagnetic radiation. The radio frequency waves used in this heating process will typically have a frequency which is within the range of about 2 to 80 MHz (megahertz). By utilizing the techniques of this invention, an 80-pound (30 kg) bail of TPBD can be rapidly heated to a temperature above 104° F. (40° C.) in a matter of minutes. During this rapid heating process, oxidative gelation does not occur to a significant degree. This is, of course, in contrast to conventional heating techniques where bails of TPBD are slowly warmed by convection heating to the required temperature over a period of days. During this long heating period, the TPBD undergoes highly undesirable oxidative crosslinking.

The present invention more specifically reveals a process for heating trans-1,4-polybutadiene to a temperature at which it can be processed without causing oxidative gelation which comprises heating the trans-1,4-polybutadiene by exposing it to electromagnetic radiation having a frequency in the range of about 2 MHz to about 80 MHz, wherein the trans-1,4-polybutadiene is oil-extended with at least 10 phr of a processing oil.

The subject invention also discloses a technique for mixing a trans-1,4-polybutadiene with at least one rubbery polymer which comprises: (1) heating the trans-1,4-polybutadiene to a temperature which is within the range of 105° F. (41° C.) to 200° F. (93° ) by exposing it to electromagnetic radiation having a frequency in the range of about 2 MHz to about 80 MHz, wherein the trans-1,4-polybutadiene is oil-extended with at least 10 phr of a processing oil; and (2) mixing the trans-1,4-polybutadiene with said rubbery polymer before any portion of the trans-1,4-polybutadiene cools to a temperature below 104° F. (41° C.).

DETAILED DESCRIPTION OF THE INVENTION

TPBD is a thermoplastic resin that can be molded into various useful articles. Because TPBD contains many double bonds in its backbone, it can also be blended and cocured with rubbers. Despite the fact that TPBD of this invention is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics. In such applications, the TPBD is generally mixed or blended with one or more rubbery polymers, such as natural rubber, synthetic polyisoprene, cis-1,4-polybutadiene, styrene-butadiene rubber, styrene-isoprene-butadiene rubber, butadiene-isoprene rubber or nitrile rubber.

The TPBD utilized in the process of this invention can be synthesized utilizing known techniques. For instance, the TPBD can be synthesized by solution polymerization utilizing the procedure described in U.S. Pat. No. 5,089,574, employing a catalyst system which is comprised of an organocobalt compound, an organoaluminum compound, a para-substituted phenol and carbon disulfide. The molecular weight of the TPBD can be controlled utilizing a molecular weight regulator selected from the group consisting of dialkyl sulfoxides, diaryl sulfoxides and dialkaryl sulfoxides as described in U.S. Pat. No. 5,448,002. The teachings of U.S. Pat. No. 5,089,574 and U.S. Pat. No. 5,448,002 are incorporated herein by reference in their entirety.

The microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84 percent are typical. At monomer concentrations of 17 percent, trans contents of about 80 percent are typical. In cases where the polymerization medium contains about 30 weight percent monomer, TPBD having a trans content of only about 68 percent is generally produced. Thus, the trans content of the TPBD can vary, but will normally be greater than about 65 percent. The transomer content of the TPBD will preferably be greater than about 75 percent and will most preferably be greater than about 80 percent.

The TPBD will be oil-extended with at least about 10 phr (parts per 100 parts by weight of TPBD resin) of processing oil before being heated by the technique of this invention. The term "oil-extended" as used herein simply means that the processing oil is distributed throughout the TPBD. Thus, the oil-extended TPBD is a composition which is comprised of the TPBD and the processing oil. The TPBD will typically be oil-extended with about 20 phr to about 50 phr of the processing oil. It is normally preferred for the TPBD to be oil-extended with 30 phr to 45 phr of the processing oil and it is typically most preferred for the TPBD to be oil-extended with 35 phr to 40 phr of the processing oil. The processing oil used will typically contain at least about 20 percent aromatic oils and will preferably contain at least about 30 percent aromatic oils. For example, the processing oil might contain 30 percent to 50 percent aromatic oils, 10 percent to 40 percent naphthenic oils and 20 percent to 50 percent paraffinic oils. A preferred processing oil for utilization in the process of this invention contains 35 percent to 45 percent aromatic oils, 15 percent to 30 percent naphthenic oils and 25 percent to 45 percent paraffinic oils.

The TPBD is heated by exposing it to radio frequency electromagnetic radiation. The radio waves used in this heating process will typically have a frequency which is within the range of about 2 MHz to about 80 MHz. It is normally preferred for the radio waves to have a frequency which is within the range of about 10 MHz to about 50 MHz. Commercially available radio frequency heating ovens which operate at a frequency of 20 MHz are highly satisfactory for this purpose. The radio frequency oven should have sufficient power to heat bails of the desired size at a rate of at least about 5° F. (2.8° ) per minute. In the case of 80-pound (30 kg) bails, ovens having a power of at least 10 kW (kilowatts) will normally be required. In the case of 80-pound (30 kg) bails, ovens having a power of at least 20 kW (kilowatts) are preferred and ovens having a power of at least 40 kW are most preferred.

It is important for the TPBD to be heated to a temperature of at least 104° F. (40° C.). Since the radio frequency electromagnetic radiation warms the TPBD from the inside to the outside, it is important for the TPBD bail to have an outside surface temperature of at least 104° F. (40° C.). In most cases, the TPBD will be heated to a temperature which is within the range of about 105° F. (41° C.) to about 200° F. (93° C.). It is normally preferred for the TPBD to be heated to a temperature which is within the range of about 110° C. (43° C.) to about 160° F. (71° C.) and it is most preferred for the TPBD to be heated to a temperature which is within the range of about 120° F. (49° C.) to about 140° F. (60° C.).

It is important to process the TPBD before the temperature of any portion of it falls below 104° F. (40° C.). In other words, the TPBD should not be allowed to cool below the desired temperature range before it is processed. Thus, the TPBD will normally be heated with the radio frequency waves immediately before it is processed so that it will not have time to cool out of the desired temperature range. In the case of TPBD bails, all of the polymer in the bail should be at a temperature above 104° F. (40° C.) at the time that it is processed. In the mixing procedures, it is normally advantageous for the radio frequency oven to be located in close proximity to the mixer being utilized.

This invention is illustrated by the following examples which are merely for the purpose of illustration and are not to be regarded as limiting the scope of the invention or the manner in which it can be practiced. Unless specifically indicated otherwise, all parts and percentages are given by weight.

Example 1

In this experiment, an 80-pound (30 kg) bail of trans-1,4-polybutadiene which was oil-extended with 4 phr of processing oil was heated from ambient temperature utilizing the technique of this invention. The processing oil used contained 40–41 percent aromatic oils, 21–26 percent naphthenic oils and 34–38 percent paraffinic oils. In the procedure used, the bail was heated in a 40 kW radio frequency heating oven which operated at a frequency of 20 MHz. A temperature probe was placed inside the bale of TPBD by drilling a hold into it and placing a thermocouple therein. The thermocouple was used to monitor temperatures and heating rates. In this experiment, a heating rate of about 25° F. (14° C.) per minute was attained. The bail of TPBD accordingly reached a suitable processing temperature above 104° F. (40° C.) in only about 2 minutes.

The bail of TPBD was subsequently allowed to cool and was evaluated to determine if gelation had occurred. This evaluation showed that there was no measurable increase in the dilute solution viscosity (DSV) of the polymer. It was concluded that oxidative gelation did not result from the heating procedure since there was no increase in the DSV of the polymer. This experiment accordingly showed that the technique of this invention is a commercially viable means for heating trans-1,4-polybutadiene to processing temperatures.

Example 2

In this experiment, the procedure of Example 1 was repeated except for the fact that the TPBD was oil-extended with only 25 phr of the processing oil. The heating rate observed in this experiment was about 8° F. (4.4° C.) per minute. Even though the heating rate attained was much slower than in Example 1, the TPBD bail did not show any signs of oxidative gelation. Analysis showed that there was not an increase in the DSV of the polymer.

Comparative Example 3

In this experiment, the procedure of Example 1 was repeated except for the fact that the TPBD was not oil-extended. In this experiment, the heating rate of the TPBD bail was only about 3° F. (1.7° C.) per minute. This heating rate is too slow to be commercially viable. Thus, this experiment shows the critical nature of oil-extending the TPBD to attain a satisfactory heating rate.

Comparative Example 4

In this experiment, a non-oil-extended TPBD was loaded with 1 phr of carbon black which is known to be a radio frequency receptor. However, upon exposure to the radio frequency waves, sparking occurred and the TPBD sample almost immediately caught on fire. Thus, this experiment shows that carbon black cannot be used as a radio frequency receptor in the TPBD. In fact, this experiment shows that the TPBD should be free of carbon black.

Comparative Example 5

In this experiment, a non-oil-extended TPBD was loaded with 1 phr of zinc oxide. Zinc oxide is a known radio frequency receptor. However, there was no appreciable improvement in heating rates over the control which did not contain any zinc oxide. Thus, this experiment shows that zinc oxide cannot be used to improve the radio frequency heating rate of TPBD.

Comparative Example 6

In this experiment, an oil-extended sample of TPBD was exposed to electromagnetic radiation in the microwave frequency range of 2450 MHz. The sample did not heat appreciably on exposure to the microwaves. This experiment accordingly shows that it is critical to heat the oil-extended TPBD with electromagnetic radiation in the radio frequency range.

This invention is illustrated by the following examples which are merely for the purpose of illustration and are not to be regarded as limiting the scope of the invention or the manner in which it can be practiced. Unless specifically indicated otherwise, all parts and percentages are given by weight.

While certain representative embodiments and details have been shown for the purpose of illustrating the present invention, it will be apparent to those skilled in this art that various changes and modifications can be made therein without departing from the scope of the present invention.

What is claimed is:

1. A process for heating trans-1,4-polybutadiene to a temperature at which it can be processed without causing oxidative gelation which comprises heating the trans-1,4-polybutadiene by exposing it to electromagnetic radiation having a frequency in the range of about 2 MHz to about 80 MHz, wherein the trans-1,4-polybutadiene is oil-extended with at least 10 phr of a processing oil.

2. A technique for mixing a trans-1,4-polybutadiene with at least one rubbery polymer which comprises: (1) heating the trans-1,4-polybutadiene to a temperature which is within the range of 105° F (41° C.) to 200° F. (93° ) by exposing it to electromagnetic radiation having a frequency in the range of about 2 MHz to about 80 MHz, wherein the trans-1,4-polybutadiene is oil-extended with at least 10 phr of a processing oil; and (2) mixing the trans-1,4-polybutadiene with said rubbery polymer before any portion of the trans-1,4-polybutadiene cools to a temperature below 104° F. (41° C.).

3. A process as specified in claim 1 wherein the trans-1,4-polybutadiene is heated at a rate of at least 5° F. per minute.

4. A process as specified in claim 3 wherein the trans-1,4-polybutadiene is heated to a temperature which is within the range of about 105° F. to about 200° F.

5. A process as specified in claim 4 wherein the trans-1,4-polybutadiene is oil-extended with about 20 phr to about 50 phr of processing oil.

6. A process as specified in claim 5 wherein the trans-1,4-polybutadiene is heated at a rate of at least 10° F. per minute.

7. A process as specified in claim 5 wherein the trans-1,4-polybutadiene is heated at a rate of at least 15° F. per minute.

8. A process as specified in claim 5 wherein the trans-1,4-polybutadiene is heated at a rate of at least 20° F. per minute.

9. A process as specified in claim 6 wherein the trans-1,4-polybutadiene is oil-extended with about 30 phr to about 45 phr of processing oil.

10. A process as specified in claim 6 wherein the trans-1,4-polybutadiene is oil extended with about 35 phr to about 40 phr of processing oil.

11. A process as specified in claim 6 wherein the trans-1,4-polybutadiene is heated to a temperature which is within the range of about 110° F. to about 160° F.

12. A process as specified in claim 6 wherein the trans-1,4-polybutadiene is heated to a temperature which is within the range of about 120° F. to about 140° F.

13. A process as specified in claim 1 wherein said processing oil contains at least 20 percent aromatic oils.

14. A process as specified in claim 4 wherein said processing oil contains at least 30 percent aromatic oils.

15. A processing oil is comprised of about 30 percent to 50 percent aromatic oils, about 10 percent to 40 percent naphthenic oils and about 20 to about 50 percent paraffinic oils.

16. A process as specified in claim 4 wherein said processing oil is comprised of about 35 percent to 45 percent aromatic oils, about 15 percent to 30 percent naphthenic oils, and about 25 to about 45 percent paraffinic oils.

17. A process as specified in claim 2 wherein the mixing step is carried out while the trans-1,4-polybutadiene is at a temperature which is within the range of about 105° F. to about 200° F.

18. A process as specified in claim 17 wherein the trans-1,4-polybutadiene is oil-extended with about 20 phr to about 50 phr of processing oil; wherein the trans-1,4-polybutadiene is heated at a rate of at least 10° F. per minute; and wherein said processing oil contains at least 20 percent aromatic oils.

19. A process as specified in claim 18 wherein the mixing step is carried out while the trans-1,4-polybutadiene is at a temperature which is within the range of about 105° F. to about 200° F.

20. A process as specified in claim 19 wherein said processing oil is comprised of about 35 percent to 45 percent aromatic oils, about 15 percent to 30 percent naphthenic oils and about 25 to about 45 percent paraffinic oils.

21. A process as specified in claim 1 wherein trans-1,4-polybutadiene is free of carbon black.

22. A technique as specified in claim 2 wherein the electromagnetic radiation has a frequency which is within the range of about 10 MHz to about 50 MHz.

* * * * *